United States Patent
Burton et al.

(10) Patent No.: US 9,714,840 B2
(45) Date of Patent: Jul. 25, 2017

(54) ROUTE DETERMINATION BASED ON USER RANKING OF WIRELESS INTERNET QUALITY OF SERVICE METRICS

(71) Applicant: International Business Machines Corporation, Armonk, NY (US)

(72) Inventors: Peter H. Burton, Vancouver (CA); Donna K. Byron, Petersham, MA (US); Manvendra Gupta, Brampton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/813,856

(22) Filed: Jul. 30, 2015

(65) Prior Publication Data

US 2017/0030733 A1 Feb. 2, 2017

(51) Int. Cl.
*H04W 24/08* (2009.01)
*H04W 72/06* (2009.01)
*G01C 21/36* (2006.01)
*H04W 72/08* (2009.01)

(52) U.S. Cl.
CPC ........ *G01C 21/3697* (2013.01); *H04W 24/08* (2013.01); *H04W 72/06* (2013.01); *H04W 72/085* (2013.01)

(58) Field of Classification Search
CPC .. G01C 21/3697; H04W 24/08; H04W 72/06; H04W 72/085
USPC ........................................................ 701/541
See application file for complete search history.

(56) References Cited

U.S. PATENT DOCUMENTS

| | | | |
|---|---|---|---|
| 7,609,678 B2 | 10/2009 | Sharma et al. | |
| 8,311,741 B1 | 11/2012 | Lawther et al. | |
| 8,645,060 B2 | 2/2014 | Venkatraman | |
| 9,226,151 B2 * | 12/2015 | Mohammed .......... | H04W 12/06 |
| 2006/0268828 A1 * | 11/2006 | Yarlagadda ........... | H04M 7/006 370/352 |
| 2007/0167174 A1 * | 7/2007 | Halcrow ............... | H04W 48/16 455/456.2 |
| 2010/0110921 A1 * | 5/2010 | Famolari ............... | H04W 48/17 370/252 |
| 2012/0059578 A1 * | 3/2012 | Venkatraman ......... | G01C 21/20 701/411 |
| 2013/0260757 A1 * | 10/2013 | Deivasigamani ..... | H04W 24/00 455/435.3 |

(Continued)

*Primary Examiner* — Atul Trivedi
(74) *Attorney, Agent, or Firm* — Brown & Michaels, PC; John R. Pivnichny

(57) ABSTRACT

A method for determining a route of travel for a mobile device from a start point to at least one destination point based on a user ranking of wireless internet quality of service metrics using a server connected to the mobile device through a network. The server receives the start point, at least one destination point, and the ranking of wireless internet quality of service metrics from the mobile device. The server determines registered wireless access points along a plurality of routes between the starting point and the at least one destination point accessible to the mobile device. The server ranks each of the plurality of routes based on the wireless internet quality of service metrics of the wireless access points along the route and the user ranking of the wireless internet quality of service metrics; and sends at least one of the routes to the mobile device.

20 Claims, 6 Drawing Sheets

(56) References Cited

U.S. PATENT DOCUMENTS

| | | |
|---|---|---|
| 2014/0067257 A1 | 3/2014 | Dave et al. |
| 2014/0235177 A1* | 8/2014 | Shaffer .................. G01C 21/20 |
| | | 455/67.11 |
| 2014/0365126 A1* | 12/2014 | Vulcano ................. G01C 21/36 |
| | | 701/533 |
| 2015/0045051 A1* | 2/2015 | Meredith ............. H04W 48/18 |
| | | 455/452.1 |
| 2016/0057691 A1 | 2/2016 | Burton et al. |

* cited by examiner

ROUTE DETERMINATION BASED ON USER RANKING OF WIRELESS INTERNET QUALITY OF SERVICE METRICS

BACKGROUND

The present invention relates to wireless network access and more specifically to route determination based on users' ranking of wireless internet quality of service metrics.

With the surge in mobile computing, being permanently connected to the internet is becoming more important. Smartphones provide the ability to conduct many business and personal tasks while being mobile and using the cellular network for communication. This can be expensive due to costly data plan rates and roaming charges. To avoid such charges, mobile users with mobile devices can leverage wireless technology, and seek open and available wireless access points. Using wireless internet in preference to cellular data works well when the user is not in-motion. However, if the user is in-motion (e.g., in a car, on a train or bus, or on foot), after moving a short distance the user will become disconnected from the wireless access point and unable to conduct tasks that require connectivity. The user is now faced with searching again for any available wireless access points, and once again negotiating connectivity for each access point, specifying credentials for different access points each time.

SUMMARY

According to one embodiment of the present invention a method for determining a route of travel for a mobile device from a start point to at least one destination point based on a user ranking of wireless internet quality of service metrics using a server connected to the mobile device through a network is disclosed. The method comprising the steps of: the server receiving the start point, at least one destination point, and the ranking of wireless internet quality of service metrics from the mobile device; the server determining registered wireless access points along a plurality of routes between the starting point and the at least one destination point accessible to the mobile device; the server ranking each of the plurality of routes based on the wireless internet quality of service metrics of the wireless access points along the route and the user ranking of the wireless internet quality of service metrics; and the server sending at least one of the routes to the mobile device.

According to another embodiment of the present invention, a computer program product for determining a route of travel for a mobile device from a start point to at least one destination point based on a user ranking of wireless internet quality of service metrics using a server connected to the mobile device through a network is disclosed. The server comprises at least one processor, one or more memories, one or more computer readable storage media, the computer program product comprising a computer readable storage medium having program instructions embodied therewith. The program instructions are executable by the server to perform a method comprising: receiving, by the server, the start point, at least one destination point, and the ranking of wireless internet quality of service metrics from the mobile device; determining, by the server, registered wireless access points along a plurality of routes between the starting point and the at least one destination point accessible to the mobile device; ranking, by the server, each of the plurality of routes based on the wireless internet quality of service metrics of the wireless access points along the route and the user ranking of the wireless internet quality of service metrics; and sending, by the server, at least one of the routes to the mobile device.

According to another embodiment of the present invention, a computer system for determining a route of travel for a mobile device from a start point to at least one destination point based on a user ranking of wireless internet quality of service metrics using a server connected to the mobile device through a network is disclosed. The system comprises a server comprising at least one processor, one or more memories, one or more computer readable storage media having program instructions executable by the computer to perform the program instructions. The program instructions comprising: receiving, by the server, the start point, at least one destination point, and the ranking of wireless internet quality of service metrics from the mobile device; determining, by the server, registered wireless access points along a plurality of routes between the starting point and the at least one destination point accessible to the mobile device; ranking, by the server, each of the plurality of routes based on the wireless internet quality of service metrics of the wireless access points along the route and the user ranking of the wireless internet quality of service metrics; and sending, by the server, at least one of the routes to the mobile device.

DETAILED DESCRIPTION

Embodiments of the present invention provide a system and method for determining a route based on user ranking of wireless internet qualities of service metrics for dynamic wireless connectivity for a mobile device which is in-motion and traveling from a start point to a destination point.

It will be understood that where the term "Wi-Fi" is used herein, it is not intended to limit the system and method to networking products that allow an electronic device to exchange data or connect to the internet using 2.4 GHz UHF and 5 GHz SHF radio signals which are manufactured under the registered certification mark "Wi-Fi" owned by the Wi-Fi Alliance, or to IEEE 802.11-type wireless access protocols, but rather to include any sort of wireless local area network (LAN) or wide area network (WAN) data access provided by distributed access points, other than the cellular telephone network. Such access points might operate using Bluetooth® or Zigbee® systems, or other systems currently in use or yet to be developed.

The system and method uses the current GPS location, input of a start location and at least one destination point and the traveling direction of the mobile device to determine routes available for the mobile device to travel along with a reference source of known available wireless access points on the routes. The routes are preferably chosen based on specific ranking of quality of service metrics provided by the user of the mobile device.

Figure 1:
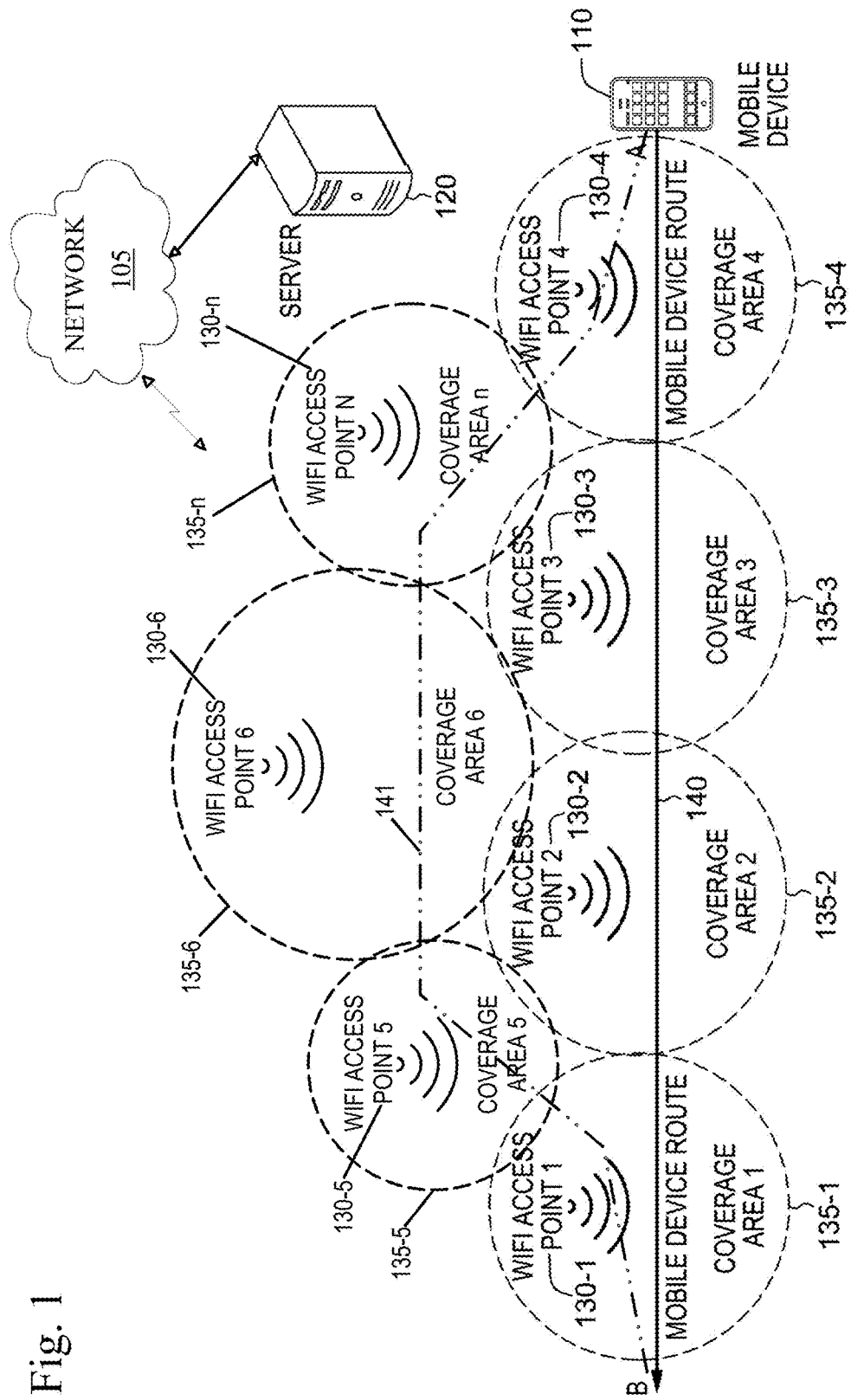
FIG. 1 is a diagram illustrating a mobile device, a server, and Wi-Fi access points along a route, in accordance with one embodiment of the present invention.

FIG. 1 is a diagram illustrating mobile device 110, server 120, and Wi-Fi access points (130-1 through 130-n) along a first mobile device route 140, and a second, alternate mobile device route 141 in accordance with one embodiment of the present invention. The various Wi-Fi Access points 130-1 . . . 130-n are connected to a network 105 such as the Internet, a private data network, or similar systems. The server 120 is also connected to the network 105. Mobile device 110 moves from location A to location B along either the first mobile device route 140 or the second mobile device route 141, or along other alternate routes may also be used which are not shown.

Along route 140, Wi-Fi access points 1 through 4 (130-1 through 130-4) are available for connectivity of mobile device 110 to the network 105. Wi-Fi access points 1 through 4 (130-1 through 130-4) have coverage areas 1 through 4 (135-1 through 135-4), respectively. Along the alternate route 141, Wi-Fi access points 4 through n (130-4 through 130-n) are available for connectivity of mobile device 110. Wi-Fi access points 4, 5, 6, and n (130-4 through 130-n) have coverage areas 4 through n (135-4 through 135-n).

It should be noted that each of the Wi-Fi access points may have or provide different qualities of service. These quality of service metrics may be, but are not limited to signal strength, area of coverage, security (specific encryption methods such as WEP or WPA or WPA2), privacy, cost of using or being provided with access to the wireless access point, radio protocol specification (IEEE 802.11a, 802.11b, 802.11g, 802.11n), type of network services, wireless mesh network (WSN) or wireless internet service provider (WISP), reliability of reputation of the provider or other metrics relating to quality of service. The reputation or reliability may be determined by each user optionally providing a rating (1 to 5 stars depending on the quality of service they get). Each provider could also be graded with an average user rating. Alternatively, the rating may be based on the average number of disconnects, reconnects, average signal strength, timeouts, etc. . . . which could then be averaged to provide a rating for reliability and reputation.

For example, the route 140, represented by the solid line, may have the route with the lowest costs to the user for wireless access, and the alternate route 141, represented by the dash-dot-dot line may have the greatest security. Another route (not shown) may have the greatest average signal strength along the route. Still another route might be chosen to give the fewest transitions from access point to access point (handoffs), or to use only access points offering the strongest encryption, or provided by a given WISP.

Referring to FIG. 1, mobile device 110 is a laptop, a tablet, a smartphone, or any mobile electronic device capable of receiving input from a user, executing computer program instructions, and communicating with another computing system (such as server 120). Server 120 is located on a computer device which is described in FIG. 5. Mobile device 110 establishes connectivity to the network 105 through Wi-Fi access points 1 through 4 (130-1 through 130-4) or Wi-Fi access points 4 through n (130-4 through 130-n).

In an embodiment of the invention, the processes for establishing connectivity of mobile device 110 to Wi-Fi access points 1 through 4 (130-1 through 130-4) or Wi-Fi access points 4-n (130-4 through 130-n) is conducted prior to arrival of mobile device 110 in the coverage areas (135-1 through 135-n) of each of Wi-Fi access points 1 through n (135-1 through 135-n). Before mobile device 110 moves out of one coverage area (say, 135-2) and enters a next coverage area 135-1, the system (for example using server 120 or device 110) processes negotiation with the next available Wi-Fi access point (130-1); thus, connectivity between mobile device 110 and the next available Wi-Fi access point (130-1) is seamlessly established as the device 110 enters the coverage area 135-1.

The negotiation could be performed with respect to the entire route, rather than one access point at a time. For example, shown as in FIG. 1, before mobile device 110 moves out of coverage area 4 (135-4), the system processes negotiation with Wi-Fi access points 1-3 (130-1 through 130-3) and pre-authenticates mobile device 110 for connectivity with Wi-Fi access points 1-3 (130-1 through 130-3). Alternatively, before the mobile device 110 moves out of coverage area 4 (135-4), the system processes negotiation with Wi-Fi access points 5-n (130-5 through 130-n). Thus, the system establishes authorized access to Wi-Fi access points 5-n (130-5 through 130-n) before the mobile device enters coverage areas 5-n (135-5 through 135-n), and mobile device 110 does not experience any loss of connectivity along mobile device route 141.

Figure 2A:
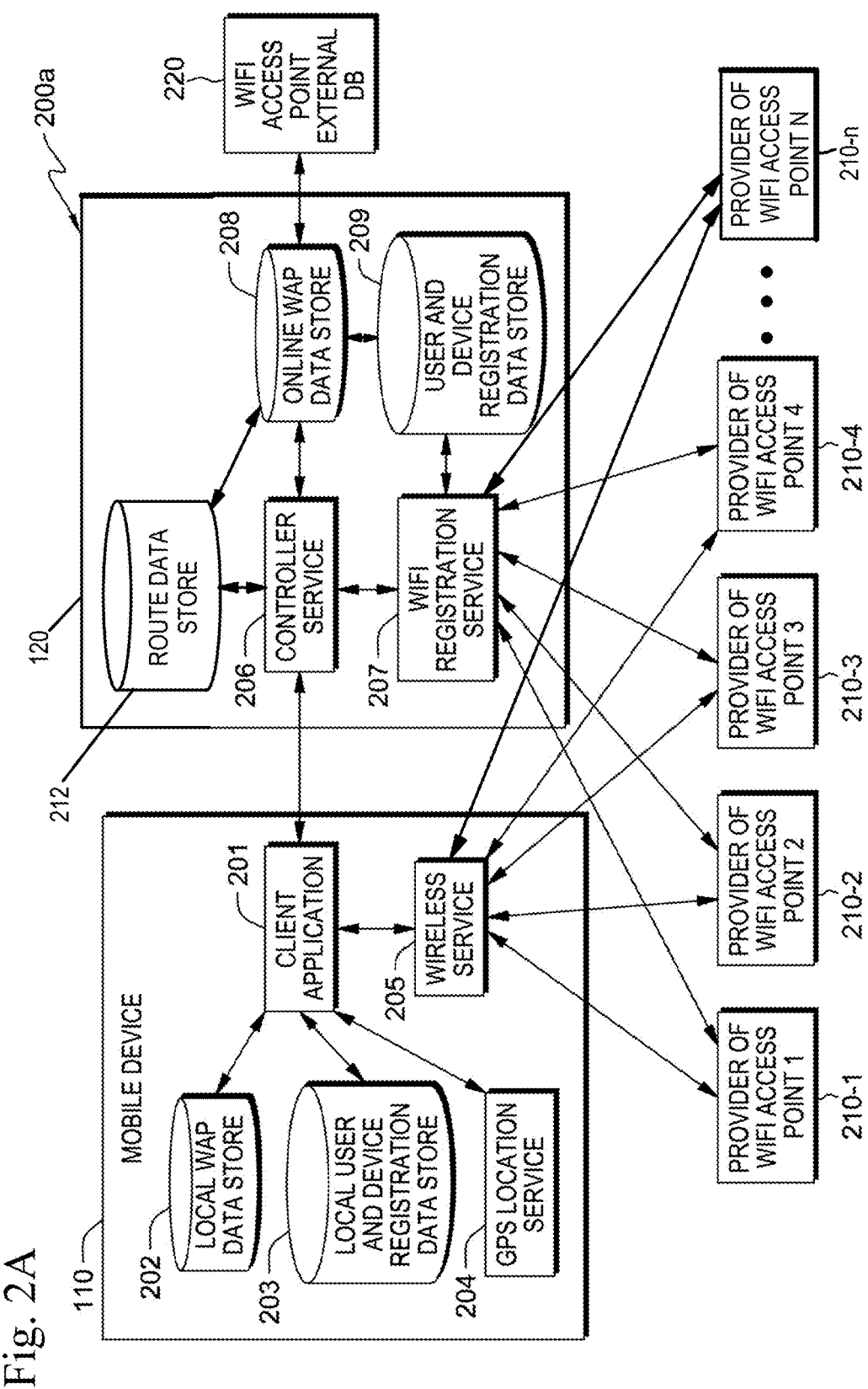
FIG. 2A is a diagram illustrating a first exemplary system for en-route wireless network access, in accordance with a first embodiment of the present invention.

FIG. 2A is a diagram illustrating system 200a for en-route wireless network access, in accordance with a first embodiment of the present invention. System 200a comprises mobile device 110, server 120, Wi-Fi access point external database 220, and a plurality of Wi-Fi access points 130-1 . . . 130-n. Shown in FIG. 2A, the plurality of the providers, for example, are providers 210-1 through 210-n of Wi-Fi access points 1 through n (130-1 through 130-n shown in FIG. 1).

Referring to FIG. 2A, mobile device 110 comprises client application 201 which has functionality on the mobile device side to establish connectivity between the mobile device and wireless access points en-route. Client application 201 communicates with other components on mobile device 110 and controller service 206 on server 120. Controller service 206 has functionality on the server side to pre-determine and establish secure access between the mobile device and wireless access points en-route, which communicates with client application 201 and other components on server 120. The controller service 206 also has the functionality to provide alternate routes and information regarding the wireless access points based on a ranking of quality of service metrics established by the user. Additionally, the controller service 206 can graphically display alternate routes between a start point and at least one destination point on a map while indicating the quality of service metric each route represents to the user of the mobile device 110.

The above-mentioned other components on mobile device 110 comprise local WAP (Wireless Access Point) data store 202, local user and device registration data store 203, GPS (Global Positioning System) location service 204, and wireless service 205. Local WAP data store 202 maintains, on mobile device 110, data of wireless access points (such as Wi-Fi access points 1 through 4 (130-1 through 130-n)).

Local user and device registration data store 203 maintains, on mobile device 110, data of mobile device 110 and the user thereof, such as data of SSID (Service Set Identification), username, and password credentials. The registration data store 203 may also include a ranking of quality of service metrics established by the user. The registration data store 203 may also include subscriptions to or pre-negotiated access to any Wi-Fi access points. GPS location service 204 provides information of the location and the route of mobile device 110. Additionally, the GPS location service 204 can graphically display alternate routes between a start point and at least one destination point on a map while indicating the quality of service metric each route represents to the user of the mobile device 110. Wireless service 205 communicates with providers 210-1 through 210-n of Wi-Fi access points 1 through n (130-1 through 130-n), and it provides connectivity between mobile device 110 and Wi-Fi access points (130-1 through 130-n) en-route based on the route chosen by the user.

The above-mentioned other components on server 120 comprise Wi-Fi registration service 207, online WAP data store 208, route data store 212, and user and device registration data store 209. Wi-Fi registration service 207 communicates with providers 210-1 through 210-n of Wi-Fi access points 1 through 4 (130-1 through 130-n). Online WAP data store 208 maintains, on server 120, data of all pre-determined and pre-authorized wireless access points (such as Wi-Fi access points 1 through n (130-1 through 130-n)) as well as quality of service metrics associated with each of the Wi-Fi access points 1 through n (130-1 through 130-n)). Online WAP data store 208 communicates with Wi-Fi access point external database 220 and retrieves relevant data stored on the external database. User and device registration data store 203 maintains, on server 120, data of mobile device 110 and the user thereof, such as data of SSID (Service Set Identification), username, password credentials, quality of service metrics of wireless access points ranked in a hierarchy as defined by a user, and subscriptions or pre-negotiated access to Wi-Fi points. The ranking of quality of service metrics may alternatively or additionally be stored on the mobile device 110. The ranking of quality of service metrics is preferably provided by the user, but may also be preset with to a specific quality of service metric as being most important. Route data store 212 includes a plurality of routes from starting points to at least one destination associated with pre-authorized wireless access points which may be based on input from the GPS location service 204. The route data store 212 communicates with the online WAP data store 208 to include data of all pre-determined and pre-authorized wireless access points (such as Wi-Fi access points 1 through n (130-1 through 130-n)) as well as metrics associated with each of the Wi-Fi access points 1 through n (130-1 through 130-n)) along the routes between the starting points and the at least one destination.

Referring to FIG. 2A, server 120 retrieves, from user and device registration data store 209, user's credentials (such as name, address, user ID, password, email address, billing information, ranking of quality of service metrics etc.) and device credentials (such as device MAC (media access control) address, and IP address). The location of the mobile device 110 and/or a starting point and at least one destination may also be retrieved from the mobile device 110 via the client application 201 from the GPS location service 204. The server 120 determines various routes between the starting point, which may be the current location, and at least one destination based on the ranking of quality of service metrics and the Wi-Fi access points 1 through n (130-1 through 130-n) along the various routes.

The routes between the starting point and the at least one destination are sent to the mobile device 110 by the server 120. The routes are preferably graphically displayed to the user on the mobile device distinguishing the quality of service metric be exemplified by said route. Once the server 120 receives a chosen route from the mobile device 110, server 120 communicates with providers 210-1 through 210-n of Wi-Fi access points 1 through n (130-1 through 130-n) along the chosen route between the starting point and the least one destination. The credentials retrieved are used to negotiate the access to Wi-Fi access points 1 through n (130-1 through 130-n) along the chosen route, before mobile device 110 enters coverage areas 1 through n (135-1 through 135-n). Access to Wi-Fi access points 1 through n (130-1 through 130-n) is qualified and approved before mobile device 110 arrives in coverage areas 1 through n (135-1 through 135-n). Appropriate or required billing services are then activated when mobile device 110 is connected to Wi-Fi access points 1 through n (130-1 through 130-n), and the user of mobile device 110 is billed accordingly by providers (210-1 through 210-n) of Wi-Fi access points 1 through n (130-1 through 130-n). The user of mobile device 110 moves from one wireless coverage area into another potentially overlapping wireless coverage area, without experiencing loss of wireless connectivity.

Figure 2B:
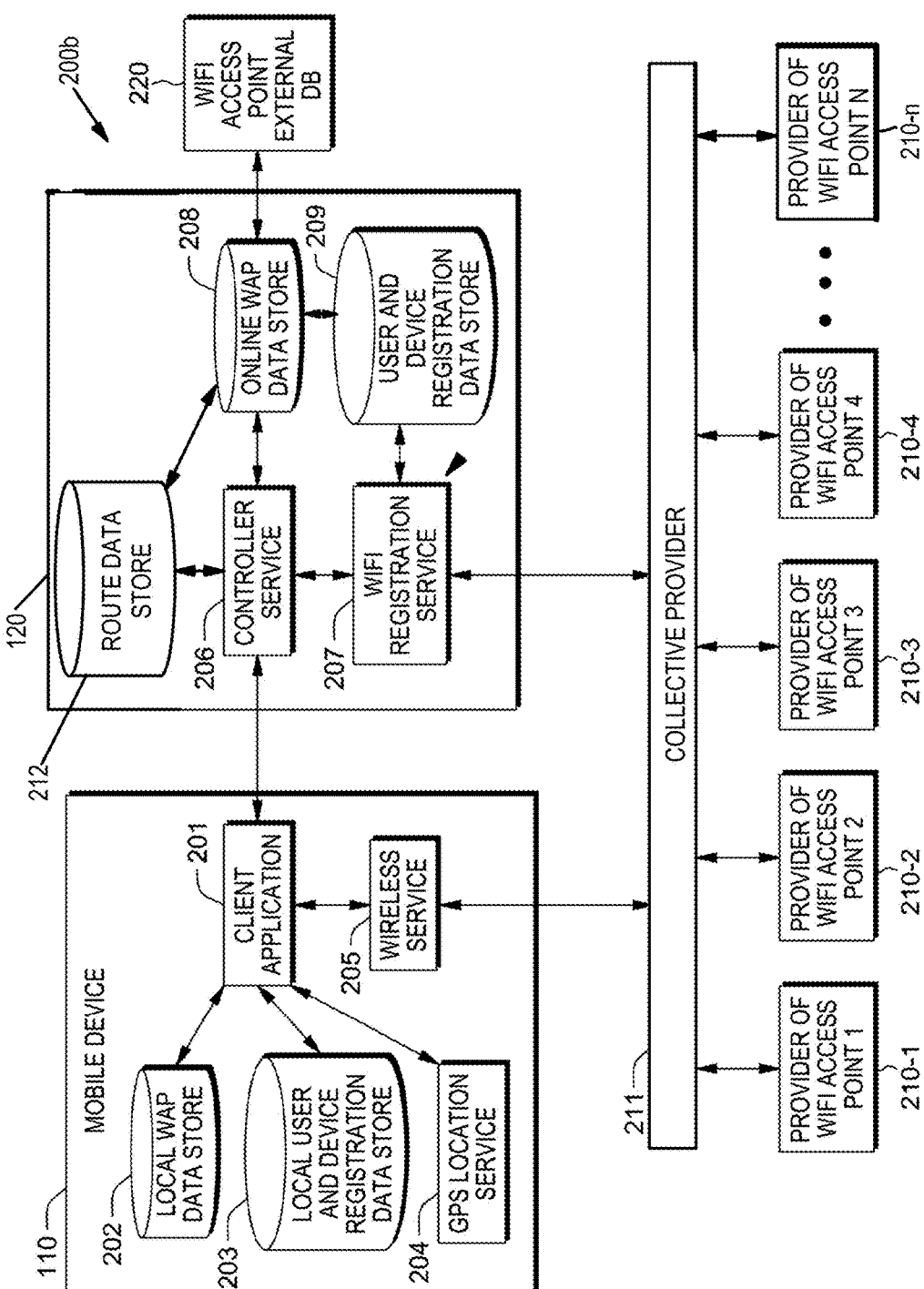
FIG. 2B is a diagram illustrating a second exemplary system for en-route wireless network access, in accordance with a second embodiment of the present invention.

FIG. 2B is a diagram illustrating system 200b for en-route wireless network access, in accordance with a second embodiment of the present invention. In the second embodiment, system 200b comprises mobile device 110, server 120, Wi-Fi access point external database 220, and providers 210-1 through 210-n of Wi-Fi access points 1 through n (130-1 through 130-n shown in FIG. 1); these components of system 200b are identical to those of system 200a. However, system 200b comprises collective provider 211.

Referring to FIG. 2B, collective provider 211 collectively groups providers 210-1 through 210-n of Wi-Fi access points 1 through n (130-1 through 130-n shown in FIG. 1). Billing to the user of mobile device 110 is performed centrally by collective provider 211 rather than by individual ones of providers 210-1 through 210-n. Wireless service 205 on mobile device 110 and Wi-Fi registration service 207 on server 120 communicate with collective provider 211 rather than individual ones of providers 210-1 through 210-n.

Figure 3:
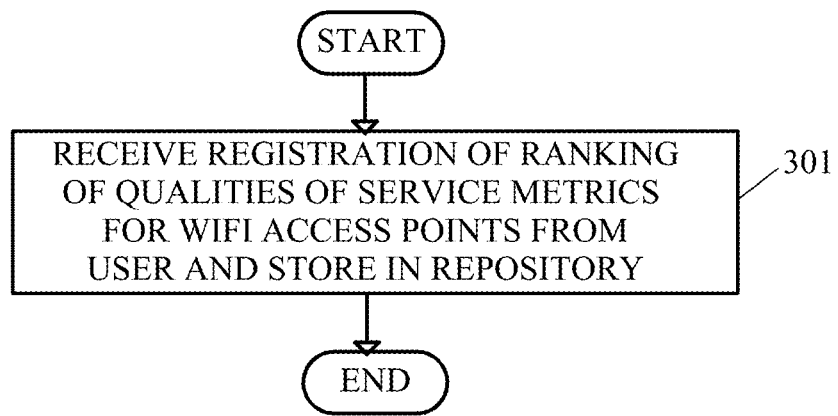
FIG. 3 shows a flow diagram of a method of registering a ranking of quality of service metrics regarding wireless internet access points.

FIG. 3 shows a flow diagram of a method of registering a ranking of quality of service metrics regarding wireless internet access points.

In a first step, a server 120 receives a registration of a ranking of qualities of service metrics for Wi-Fi access points from the mobile device 110 and stores the ranking in a repository (step 301), for example in the user and device registration data store 209. The ranking may additionally be present on the mobile device 110, for example in the local user and device registration data store 203. The method ends.

The quality of service metrics may be, but is not limited to signal strength, area of coverage, security (specific encryption methods such as WEP or WPA or WPA2), privacy, cost of using or being provided with access to the wireless access point, radio protocol specification (IEEE 802.11a, 802.11b, 802.11g, 802.11n), type of network services, wireless mesh network (WSN) or wireless internet service provider (WISP), reliability of reputation of the provider or other metrics relating to quality of service. The ranking provides an indication of the user's relative preferences of at least two different metrics. The reputation or reliability may be determined by each user optionally providing a rating (1 to 5 stars depending on the quality of service they get). Each provider could also be graded with an average user rating. Alternatively, the rating may be based on the average number of disconnects, reconnects, average signal strength, timeouts, etc. . . . which could then be averaged to provide a rating for reliability and reputation.

For example, a user might value a higher-speed protocol (802.11g rather than 802.11b, for example) and he might also prefer access points with greater security (WPA2 over WEP), but he is not as sensitive to the cost of using the access points. Another user might prefer to avoid changing wireless access points, so he would rank choosing wireless access points with the widest area of coverage over speed of access.

Figure 4:
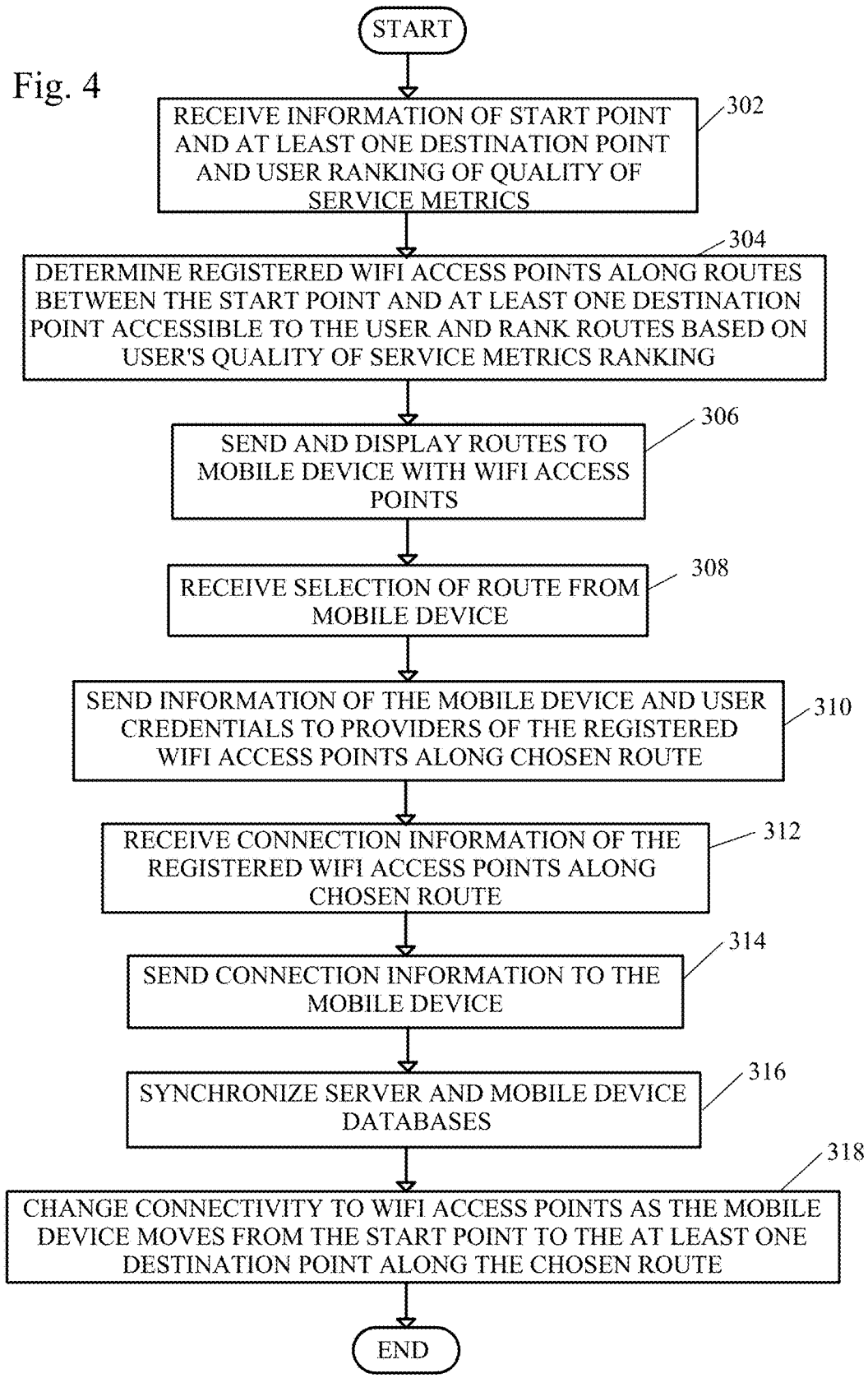
FIG. 4 shows a flow diagram of a method of route determination between a start point and at least one destination based on wireless internet qualities of service.

FIG. 4 shows a flow diagram of a method of route determination between a start point and at least one destination based on wireless internet qualities of service.

In a first step (step 302) the server receives information of a start point and at least one destination or destination point and a quality of service metrics ranking associated with a user of the mobile device. The information regarding the start point and destination may be obtained from or sent by the GPS location service 204 shown in FIG. 2A and FIG. 2B of the mobile device 110. In another embodiment, server 120 receives route information that is pre-planned and input by the user of the mobile device through the mobile device.

Based on the start point and at least one destination point and the ranking of quality of service metrics, server 120 determines registered Wi-Fi access points along different routes, based on a database on server 120 (step 304). In the embodiment, the database is online WAP data store 208 (shown in FIG. 2A and FIG. 2B). The online WAP data store 208 communicates with Wi-Fi access point external database 220 and retrieves data stored on the external database. In response to receiving the list from mobile device 110, server 120 checks online WAP data store 208 and chooses from the list the Wi-Fi access points registered by mobile device 110 which match the user defined ranking of quality of service metrics and would allow the user to travel from the starting point to at least a destination point.

All routes with Wi-Fi access points available are sent to and displayed on the mobile device by the server (step 306). The routes may be presented to the user through the mobile device in a ranked or hierarchical order based on the user's ranking of quality of service metrics preferences. Alternatively, only the best route (i.e. the one which best meets the user's ranking of metrics) presented in step 306, if preferred.

If more than one route was presented in step 306, the server 120 receives a selection of a route of travel from the mobile device (step 308). If only one route was presented in step 306, either because only one route was possible or because the alternative of only presenting the best route had been selected, this step could be skipped.

In the example, the registered Wi-Fi access points are Wi-Fi access points 1 through n (130-1 through 130-n) shown in FIG. 1. Two routes which provide Wi-Fi access points between a starting point A and a destination point B are shown in FIG. 1, route 140 and route 141, but additional routes may also be present.

The routes 140, 141 would be displayed to the user on the mobile device, preferably by graphically overlaying the routes on a map showing the starting point and at least the destination point. The different routes may be coded to indicate what metric is being exemplified. In an example, the user's ranking of quality of service metrics may provide a higher rank or rating for lower cost over security or privacy.

For example, the route 140, represented by the solid line, may have the route with the lowest costs to the user for wireless access, and the alternate route 141, represented by the dash-dot-dot line may have the greatest security. As noted above, all of the routes available can be provided to the user of the mobile device to choose which route they wish to travel, or some subset of the routes (the first four or five, for example), or the system could be set to provide only the "best" route.

Information of the mobile device 110 and credentials of the user of the mobile device are sent by server 120 to providers 210-1 through 210-n (shown in FIG. 2A) or collective provider 211 (shown in FIG. 2B) (step 310). After negotiating the access to Wi-Fi access points 1 through 4 (130-1 through 130-n), the server 120 receives connection information of the registered Wi-Fi access points along the chosen route from providers 210-1 through 210-n or collective provider 211 (step 312).

The server 120 sends the connection information to the mobile device (step 314).

The server 120 synchronizes databases with the mobile device 110 (step 316). The databases include local WAP data store 202 on mobile device 110, local user and device registration data store 203 on mobile device 110, online WAP data store 208 on server 120, route data store 212 on server 120 and user and device registration data store 209 on server 120.

The mobile device 110 dynamically changes Wi-Fi connectivity en-route, according to the connectivity information and the method ends.

For example, when mobile device 110 enters coverage area 4 (135-4) shown in FIG. 1, the mobile device establishes connectivity to Wi-Fi access point 4 (130-4). When mobile device 110 leaves coverage area 4 (135-4) and enters coverage area 3 (135-3) or coverage area n, depending on the route chosen, the mobile device 110 establishes connectivity to Wi-Fi access point 3 (130-3) or Wi-Fi access point n (130-n). Therefore, mobile device 110 establishes connectivity to respective Wi-Fi access points 1 through n (135-1 through 135-n), as the mobile device moves along the chosen route.

Figure 5:
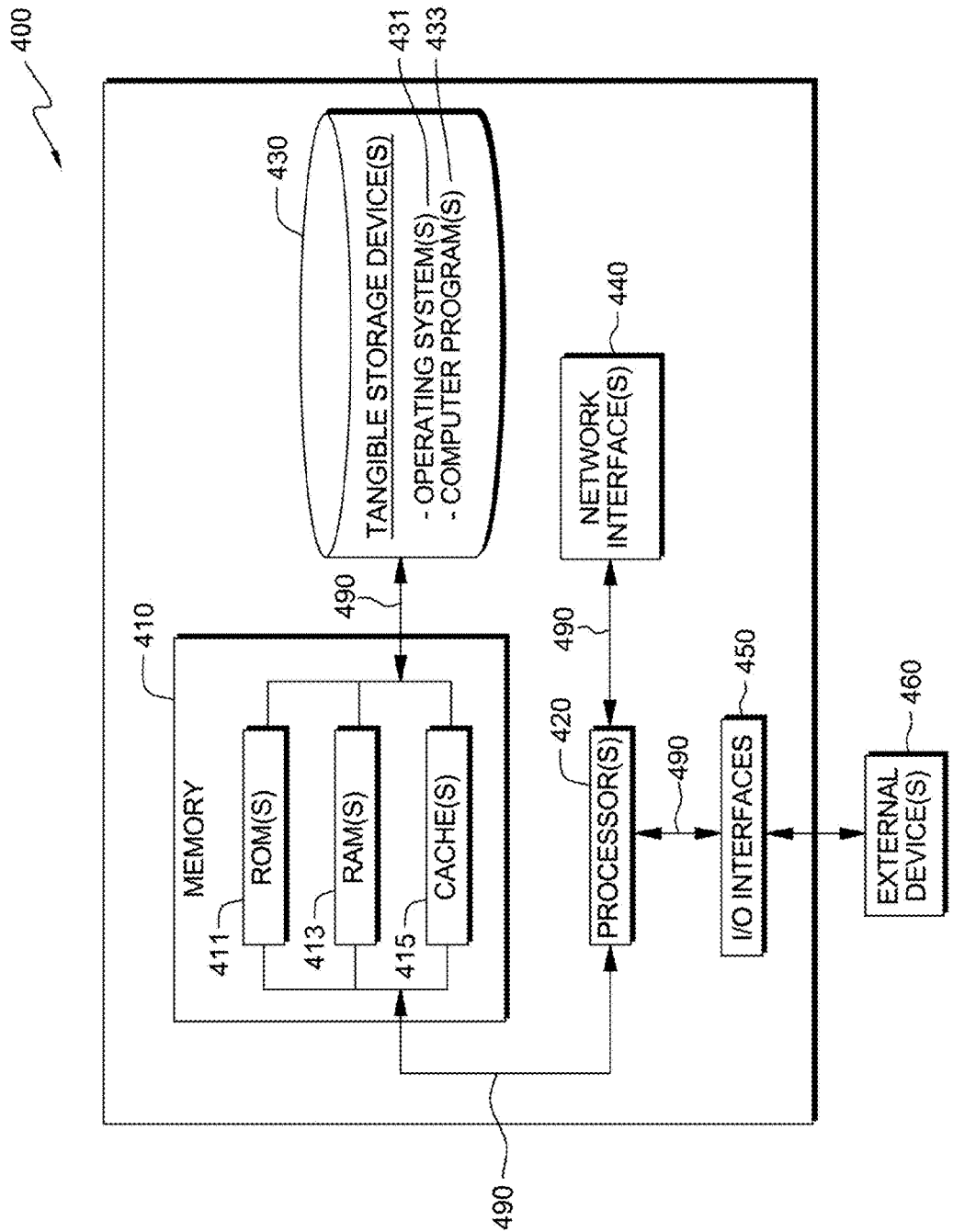
FIG. 5 is a diagram illustrating components of a computer device hosting a server shown in FIG. 1, in accordance with one embodiment of the present invention.

FIG. 5 is a diagram illustrating components of a computer device hosting a server shown in FIG. 1, in accordance with one embodiment of the present invention. It should be appreciated that FIG. 5 provides only an illustration of one implementation and does not imply any limitations with regard to the environment in which different embodiments may be implemented.

Referring to FIG. 5, computer device 400 includes processor(s) 420, memory 410, tangible storage device(s) 430, network interface(s) 440, and I/O (input/output) interface(s) 450. In FIG. 5, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer-readable tangible storage device(s) 430. Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method for determining a route of travel for a mobile device from a start point to at least one destination point based on a user ranking of wireless internet quality of service metrics using a server connected to the mobile device through a network, comprising the steps of:
- the server receiving the start point, at least one destination point, and the ranking of wireless internet quality of service metrics from the mobile device;
- the server determining registered wireless access points along a plurality of routes between the starting point and the at least one destination point accessible to the mobile device;
- the server ranking each of the plurality of routes based on the wireless internet quality of service metrics of the wireless access points along the route and the user ranking of the wireless internet quality of service metrics, such that the quality of internet service metrics which is maximized along the route between the start point and the at least one destination point is security protocol of registered wireless access points along the route; and
- the server sending at least one of the routes to the mobile device.

2. The method of claim 1, further comprising the steps of:
- the server sending user credentials and information regarding the mobile device to providers of the registered wireless access points on the route;
- the server receiving connection information of the registered wireless access points on the route; and
- the server sending the connection information to the mobile device.

3. The method of claim 2, further comprising the mobile device changing connectivity to the registered wireless access points on the route as the mobile device travels along the route.

4. The method of claim 1, wherein additional metrics regarding quality of wireless internet service are selected from the group consisting of: costs, radio modulation, reliability of a provider of the wireless internet access points and type of network services.

5. The method of claim 1, wherein the server sends a plurality of routes to the mobile device, ranked according to the user ranking of wireless internet quality of service metrics, further comprising the step of the server receiving a selection of a route from the mobile device.

6. The method of claim 5, further comprising the step of displaying the plurality of routes to the user on the mobile device.

7. The method of claim 6, in which each of the plurality of routes are displayed with at least one indication of the wireless internet quality of service metrics for the route.

8. A computer program product for determining a route of travel for a mobile device from a start point to at least one destination point based on a user ranking of wireless internet quality of service metrics using a server connected to the mobile device through a network, a server comprising at least one processor, one or more memories, one or more computer readable storage media, the computer program product comprising a computer readable storage medium having program instructions embodied therewith, the program instructions executable by the server to perform a method comprising:
- receiving, by the server, the start point, at least one destination point, and the ranking of wireless internet quality of service metrics from the mobile device;
- determining, by the server, registered wireless access points along a plurality of routes between the starting point and the at least one destination point accessible to the mobile device;
- ranking, by the server, each of the plurality of routes based on the wireless internet quality of service metrics of the wireless access points along the route and the user ranking of the wireless internet quality of service metrics, such that the quality of internet service metrics which is maximized along the route between the start point and the at least one destination point is security protocol of registered wireless access points along the route; and
- sending, by the server, at least one of the routes to the mobile device.

9. The computer program product of claim 8, further comprising program instructions comprising:
- sending, by the server, user credentials and information regarding the mobile device to providers of the registered wireless access points on the route;
- receiving, by the server, connection information of the registered wireless access points on the route; and
- sending, by the server, the connection information to the mobile device.

10. The computer program product of claim 9, further comprising the mobile device changing connectivity to the registered wireless access points on the route as the mobile device travels along the route.

11. The computer program product of claim 8, wherein additional metrics regarding quality of wireless internet service are selected from the group consisting of: costs, radio modulation, reliability of a provider of the wireless internet access, and type of network services.

12. The computer program product of claim 8, wherein the server sends a plurality of routes to the mobile device, ranked according to the user ranking of wireless internet quality of service metrics, further comprising the program instructions of receiving, by the server, a selection of a route from the mobile device.

13. The computer program product of claim 12, further comprising the program instructions of displaying the plurality of routes to the user on the mobile device.

14. The computer program product of claim 13, in which each of the plurality of routes are displayed with at least one indication of the wireless internet quality of service metrics for the route.

15. A computer system for determining a route of travel for a mobile device from a start point to at least one destination point based on a user ranking of wireless internet quality of service metrics using a server connected to the mobile device through a network, the system comprising a server comprising at least one processor, one or more memories, one or more computer readable storage media having program instructions executable by the computer to perform the program instructions comprising:
- receiving, by the server, the start point, at least one destination point, and the ranking of wireless internet quality of service metrics from the mobile device;
- determining, by the server, registered wireless access points along a plurality of routes between the starting point and the at least one destination point accessible to the mobile device;
- ranking, by the server, each of the plurality of routes based on the wireless internet quality of service metrics of the wireless access points along the route and the user ranking of the wireless internet quality of service metrics, such that the quality of internet service metrics which is maximized along the route between the start point and the at least one destination point is security protocol of registered wireless access points along the route; and sending, by the server, at least one of the routes to the mobile device.

16. The computer system of claim 15, further comprising program instructions comprising:
sending, by the server, user credentials and information regarding the mobile device to providers of the registered wireless access points on the route;
receiving, by the server, connection information of the registered wireless access points on the route; and
sending, by the server, the connection information to the mobile device.

17. The computer system of claim 15, wherein additional metrics regarding quality of wireless internet service are selected from the group consisting of: costs, radio modulation, reliability of a provider of the wireless internet access, and type of network services.

18. The computer system of claim 15, wherein the server sends a plurality of routes to the mobile device, ranked according to the user ranking of wireless internet quality of service metrics, further comprising the program instructions of receiving, by the server, a selection of a route from the mobile device.

19. The computer system of claim 18, further comprising the program instructions of displaying the plurality of routes to the user on the mobile device.

20. The computer system of claim 19, in which each of the plurality of routes are displayed with at least one indication of the wireless internet quality of service metrics for the route.

* * * * *